United States Patent [19]

Kiryu et al.

[11] Patent Number: 4,500,251
[45] Date of Patent: Feb. 19, 1985

[54] MULTIJOINT MANIPULATOR

[75] Inventors: Yuichi Kiryu, Tokyo; Tadashi Sawada, Sagamihara, both of Japan

[73] Assignee: Mitsubishi Denki Kabushiki Kaisha, Tokyo, Japan

[21] Appl. No.: 463,016

[22] Filed: Feb. 1, 1983

[30] Foreign Application Priority Data

Feb. 5, 1982 [JP] Japan .................................. 57-17007
Feb. 17, 1982 [JP] Japan ............................ 57-20823[U]

[51] Int. Cl.³ ...................... B66C 23/00; B66C 23/72
[52] U.S. Cl. .................................. 414/719; 248/123.1; 248/292.1; 414/7; 414/735; 901/21; 901/48
[58] Field of Search ............... 414/719, 720, 729, 735, 414/1, 4, 7; 901/48, 49, 50, 21; 248/584, 592, 596, 123.1, 292.1

[56] References Cited

U.S. PATENT DOCUMENTS

| 2,665,102 | 1/1954 | Perbal | 248/584 |
| 4,078,670 | 3/1978 | Francois et al. | 901/21 X |
| 4,398,863 | 8/1983 | Shum | 901/23 X |

Primary Examiner—Robert J. Spar
Assistant Examiner—Donald W. Underwood
Attorney, Agent, or Firm—Oblon, Fisher, Spivak, McClelland & Maier

[57] ABSTRACT

There is disclosed a multijoint in which the primary moment force caused by a combined gravity of the lower arm which is supported by an elbow joint portion for pivotting the upper and lower arm together and a distal mechanism fitted to the distal end of the lower arm, is minimized by imparting a force opposite the primary moment force thereby reducing the load of an electric motor for driving the elbow joint portion.

10 Claims, 5 Drawing Figures

MULTIJOINT MANIPULATOR

The present invention relates to a multijoint manipulator having upper and lower arms. More particularly, it relates to a multijoint manipulator in which the primary moment force caused by a combined gravity of the lower arm which is supported by an elbow joint portion for pivotting the upper and lower arm together and a distal mechanism fitted to the distal end of the lower arm, is minimized by imparting a force opposite the primary force thereby reducing load of an electric motor for driving the elbow joint portion.

Figure 1:
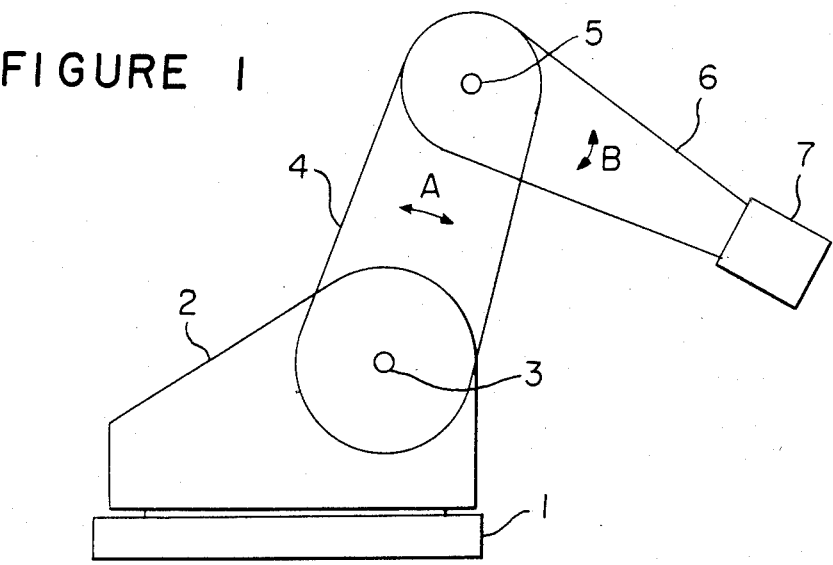

Generally, a multijoint manipulator referrs to a device as shown in FIG. 1 when viewed from one side. In the multijoint manipulator shown in FIG. 1, a main body (2) is mounted on a base (1) fixed to a floor so as to be rotatable around an axis perpendicular to the floor surface; one end of an upper arm (4) is pivotally supported by a shoulder joint portion (3) of the main body (2); one end of a lower arm (6) is pivotally supported by an elbow joint portion (5) formed at the other end of the upper arm (4) and a distal device (7) such as a rotatable grasping device is connected to the distal end of the lower arm (6).

In FIG. 1, the upper arm (4) is rotated in the direction of the arrow mark (A) around the shoulder joint portion as a center of revolution with respect to the main body by a driving means such as an electric motor for driving the upper arm. The lower arm (6) is rotated in the direction of the arrow mark (B) around the elbow joint portion (5) as a center of revolution with respect to the upper arm by a driving means such as an electric motor for driving the lower arm. In FIG. 1, the electric motor for driving the arms and transmission mechanism are omitted.

In the structure shown in FIG. 1, even in a static state of the upper and lower arms (4), (6), clockwise primary moment forces respectively produced at the shoulder joint portion (3) and the elbow joint portion (5) by the gravity are applied to respective electric motors for driving them. When they are driven, the motors are respectively applied with the primary moment force, as described above, which is a needless load as well as the secondary moment force of mass (moment force of inertia). Accordingly, it is necessary to use an electric motor and a driving mechanism having a greater output for driving the entire mechanism in addition to elimination of the needless load of the primary moment in comparison with a case that only the secondary moment is driven. This has resulted in an expensive manufacturing cost and needless consumption of power.

The present invention aims to eliminate the primary moment force caused by the dead weight of the lower arm (6) with use of a simple structure. There have been proposed mainly two expedients for eliminating the primary moment force: a dynamic balance system in which a compensative force reactive to the gravity is applied to a multijoint mamipulator by means of air pressure, a spring etc. and a static balance system in which distribution of mass should be considered in design so that the primary moment force caused by the gravity is substantially eliminated at the joint portions as described above. Description will herein be made in the dynamic balance system.

The primary moment acting on the elbow joint portion (5) becomes maximum when the lower arm (6) is in the horizontal position and becomes zero when it is vertical. Accordingly, a dynamic balance system having a satisfactory characteristic can be easily attained by applying a compensative force so that dependent on relative angle formed by the main body (2) and the upper arm (4), the maximum force is applied to the shoulder joint portion (3) when the upper arm (4) is horizontal to the floor surface and no force is imparted when it is vertical.

With regard to the elbow joint portion (5), however, there is no restriction for the upper arm (4) in taking any angle with respect to the floor surface. It is, therefore, impossible to eliminate the primary moment force caused by the gravity even by applying the compensative force depending on the relative angle given by the upper and lower arms. That is, the dynamic balance at the elbow joint portion (5) must be given by a compensative force depending on the relative angle of the lower arm (6) to the floor surface.

It is an object of the present invention to obtain accurately the dynamic balance of the primary moment at the elbow joint portion of a multijoint manipulator with a simple structure.

It is another object of the present invention to reduce a load of a driving means such as an electric motor for driving a lower arm of a multijoint manipulator to aim improvement in an economical viewpoint.

It is still another object of the present invention to reduce the primary moment force of a lower arm of a multijoint manipulator without using special driving source and transmission mechanisms.

The foregoing and the other objects of the present invention have been attained by providing a multijoint manipulator comprising an upper arm having one end which is pivotally supported by a shoulder joint portion of a main body to be capable of rotation around the shoulder joint portion, a lower arm having one end which is pivotally supported by an elbow portion formed at the other end of the upper arm to be capable of rotation around of the elbow joint portion, a distal device fitted to the distal end of the lower arm, a first chain wheel fitted to the lower arm having its center, in coaxial with the center of revolution of the elbow joint portion, a second chain wheel rotatably fitted to the shoulder joint portion, the center of the second chain wheel being in coaxial with the center of revolution of the shoulder joint portion, a transmitting means for linking the first and second chain wheels to rotate them at the same angle and a torque producing means which has one end secured to the main body and the other end secured to the second chain wheel to impart the maximum torque when the lower arm is in the horizontal position and to impart the minimum torque when the lower arm is in the vertical position.

The present invention will be described with reference to preferred embodiments illustrated in the accompanying drawings.

Figure 2:
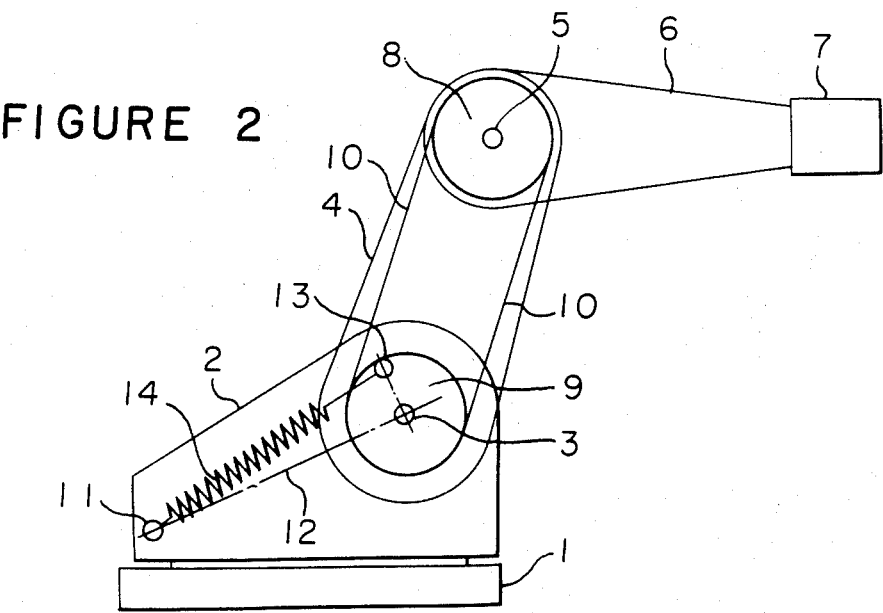
Figure 3:
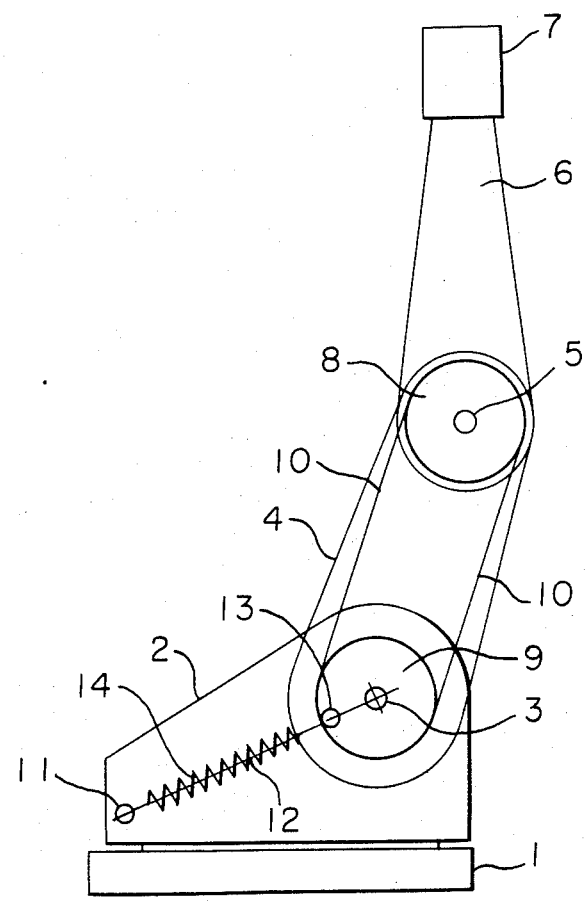
Figure 4:
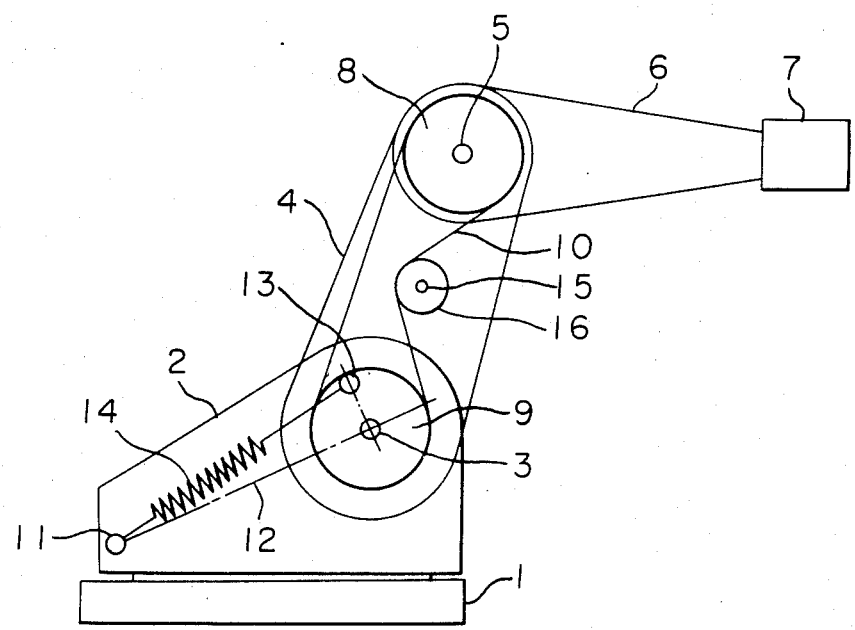
Figure 5:
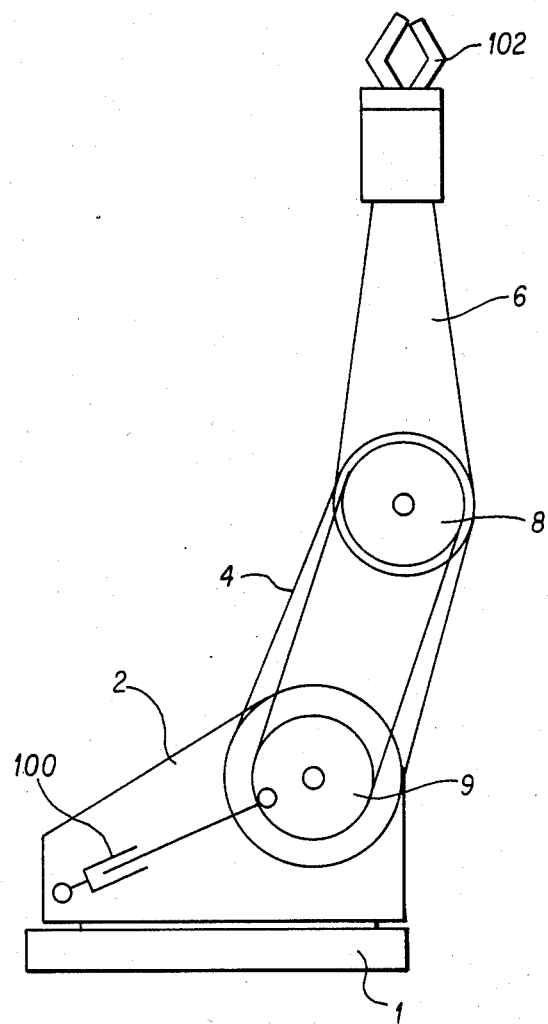

FIG. 1 is a schematic front view showing generally main parts of a multijoint manipulator;

FIGS. 2 and 3 respectively schematic front views of an embodiment of the multijoint manipulator;

FIG. 4 is a schematic front view of another embodiment of the present invention; and FIG. 5 is a schematic front view of a third embodiment of the invention.

Preferred embodiments of the multijoint manipulator structure of the present invention will be described in detail.

FIGS. 2 and 3 show an embodiment of this invention. In this embodiment, description on an expedient for eliminating the primary moment force of an upper arm (4) is omitted and the same reference numerals as in FIG. 1 are used to the same or corresponding parts thereby to omit the descriptions.

In FIGS. 2 and 3, a first chain wheel (8) is secured to a lower arm (6) so as to coincide its center with the center of revolution of an elbow joint portion (5) and a second chain wheel (9) having the same diameter and pitch as the first chain wheel (8) is rotatably fitted to the upper arm portion so that the center of the second chain wheel is positioned in coaxial with the center of revolution of a shoulder joint portion (3). These chain wheels (8), (9) are linked through a transmitting means (10) such as a chain, timing belt and so on which is suitable to mesh with them. The second chain wheel (9) is so adapted that it rotates regardless of the variation of angle of the upper arm (4) to the floor surface, but is rotated through the transmitting means (10) to have the variation of angle exactly corresponding to that of the lower arm (6) with respect to the floor surface.

A connecting pin (11) is attached on a part of the main body and a separate connecting pin (13) is attached on the second chain wheel (9) itself or on a part connected therewith such a manner that as shown in FIG. 2, when the lower arm (6) is so positioned as to be horizontal to the floor surface, i.e., zero degrees in the relative angle, the connecting pin (13) is on a linear line passing through the center of revolution of the chain wheel (9) and the pin (13), the line being perpendicular to a linear line (12) connecting the connecting pin (11) with the center of revolution of the shoulder joint portion (3). Between the connecting pins (11), (13), there is fitted a spring (14), as a torque producing means, which provides a spring action so as to eliminate substantially the primary moment caused by the gravity of the lower arm (6) in this positional relationship.

When the lower arm (6) takes a posture with a relative angle of perpendicularity to the floor surface in the upward or downward direction, the second chain wheel (9) is rotated counter-clockwisely or clockwisely by 90° from the state shown in FIG. 2 to shift the connecting pin (13) on the linear line (12). Accordingly, pulling force of the spring (14) does not cause any torque on the second chain wheel (9). Namely, when the lower arm (6) takes a posture of a relative angle of perpendicularity to the floor surface in the upward direction as shown in FIG. 3, there is no torque effected on the second chain wheel (9) by the tensile force of the spring (14).

Assuming that a relative angle in the position as shown in FIG. 2 is deemed as zero and the spring (14) always pulls the connecting pin (13) with a constant strength in parallel to the linear line (12), torque effected on the second chain wheel (9) by the spring (14) varys dependent on a cosine function. On the other hand, the primary moment force due to the gravity applied to the second chain wheel (9) by the lower arm (6) also varys dependent on a cosine function. Accordingly, under such ideal condition, the primary moment force by the gravity applied to the elbow joint portion (5) can be completely compensated.

Practically, since the spring has a limited length, pulling force is not constant and the connecting pin (13) can not be placed so that the spring extends in parallel to the linear line (12), truly ideal condition can not be attained. However, the multijoint manipulator of the present invention can reduce the primary moment force to an extent of being free from a problem in practical use.

Description has been made on the embodiment in which a spring is used. It is, however, possible to use an air cylinder mechanism with a constant pressure to realize the same function as that of the embodiment.

As described above, in accordance with this embodiment, there is provided a multijoint manipulator which reduces the primary moment due to the gravity at the elbow joint portion and substantially reduces the load of an electric motor for driving the elbow joint portion.

FIG. 4 shows another embodiment of the present invention.

The same reference numerals as in FIG. 2 designate the same or corresponding parts. Also, description on an expedient for eliminating the primary moment of the upper arm (4) is omitted.

In FIG. 4, the reference numeral (15) designates the shaft of a motor which is mounted on the upper arm (4) to rotate the lower arm (6) around the elbow joint portion (5) as the center of revolution. On the motor shaft (15), there is fixedly secured a sprocket wheel (16) which is placed between the chain wheels (8), (9). These chain wheels (8), (9) are linked through the sprocket wheel (16) by the transmitting means such as a chain, timing belt and so on which is made suitable to mesh therewith so that the revolution of the motor shaft (15) rotates through the sprocket wheel (16) the first chain wheel (8), hence the lower arm (6). The revolution of the second chain wheel (9) is, however, related to the revolution of the upper arm (4). Namely, the second chain wheel (9) is so arranged that it rotates regardless of the variation of angle of the upper arm (4) to the floor surface, but rotates through the transmitting means (10) to have the variation of angle exactly corresponding to that of the lower arm (6) to the floor surface.

In this embodiment, as similar to that shown in FIG. 2, a connecting pin (11) is attached on a part of the main body (2) and a separate connecting pin (13) is attached on the second chain wheel (9) itself or on a part connected therewith such a manner that as shown in FIG. 4, when the lower arm (6) is so positioned as to be horizontal to the floor surface, i.e., zero degree with respect to a relative angle, the connecting pin (13) is on a linear line passing through the center of revolution of the chain wheel (9) and the pin (13), the line being perpendicular to a linear line (12) connecting the connecting pin (11) with the center of revolution of the shoulder joint portion (3). Between the connecting pins (11), (13), there is fitted a spring (14) which provides a spring action so as to eliminate substantially the primary moment caused by the gravity of the lower arm (6) in this positional relationship.

When the lower arm (6) takes a posture with a relative angle of perpendicularity to the floor surface in the upward or downward direction, the second chain wheel (9) is rotated counter-clockwisely or clockwisely by 90° from the state as shown in FIG. 4 to shift the connecting pin (13) on the linear line (12). Accordingly, pulling force of the spring (14) does not cause any torque on the second chain wheel (9).

Assuming that a relative angle in the position as shown in FIG. 4 is deemed as zero and the spring (14) always pulls the connecting pin (13) with a constant strength in parallel to the linear line (12), torque effected on the second chain wheel (9) by the spring varys dependent on a cosine function. On the other hand, the primary moment force due to the gravity applied to the second chain wheel (9) by the lower arm (6) also varys dependent on a cosine function. Accordingly, under such ideal condition, the primary moment force by the gravity applied to the elbow joint portion (5) can be completely compensated.

Practically, since the spring has a limited length, the pulling force is not constant and the connecting pin (13) can not be placed so that the spring extends in parallel to the linear line (12), truly ideal condition can not be attained. However, the multijoint manipulator of the present invention can reduce the primary moment force to an extent that no problem arises in practical use.

In this embodiment, the driving force of the motor to rotate the lower arm (6) is utilized to reduce the primary moment force of the lower arm (6) with the consequence that it is unnecessary to provide special devices such as driving source and transmitting means.

Description has been made on the embodiment in which the spring is used. It is, however, possible to use an air cylinder mechanism with a constant air pressure to realize the same function as that of the embodiment described above.

In accordance with the embodiment, the primary moment due to the gravity at the elbow joint part can be reduced and the load of an electric motor for driving the elbow joint portion can be remarkably reduced, even by a simple structure, by utilizing the dirving force of the motor for rotating the lower arm.

In the embodiment of FIG. 5, the spring 14 is replaced by a hydraulic cylinder 100. A rotatable grasping device is shown at 102.

What is claimed as new and desired to be secured by Letters Patent of the United States is:

1. A multijoint manipulator which comprises:
   an upper arm having one end which is pivotally supported by a shoulder joint portion of a main body to be capable of rotation around said shoulder joint portion;
   a lower arm having one end which is pivotally supported by an elbow joint portion formed at the other end of said upper arm to be capable of rotation around said elbow joint portion;
   a distal device fitted to the distal end of said lower arm;
   a first chain wheel fixedly fitted to said lower arm having its center coaxial with the center of revolution of said elbow joint portion;
   a second chain wheel rotatably fitted to said shoulder joint portion, the center of said second chain wheel being coaxial with the center of revolution of said shoulder joint portion;
   a transmitting means for linking said first and second chain wheels to rotate them at the same angle; and
   a torque producing means which has one end secured to said main body and the other end secured to said second chain wheel to impart the maximum torque when said lower arm is in the horizontal position and to impart the minimum torque when said lower arm is in the vertical position,
   wherein when said lower arm is in the horizontal position, the other end of said torque producing means is at the periphery portion of said second chain wheel on a linear line perpendicular to a line passing through the center of revolution of said shoulder joint portion and said one end secured to said main body,
   whereby said torque producing means is affected only by the position of said lower arm.

2. A multijoint manipulator according to claim 1 wherein the other end of said torque producing means is secured to the peripheral portion of said second chain wheel.

3. A multijoint manipulator according to claim 1 wherein said torque producing means is a spring.

4. A multijoint manipulator according to claim 4 wherein both ends of said spring are secured to said main body and said second chain wheel by means of connecting pins.

5. A multijoint manipulator according to claim 1 wherein said torque producing means is a cylinder mechanism for producing a constant pressure by hydraulic pressure.

6. A multijoint manipulator according to claim 1 wherein said transmitting means is a chain.

7. A multijoint manipulator according to claim 1 wherein said transmitting means is a timing belt.

8. A multijoint manipulator according to claim 1 wherein said distal device is a rotatable grasping device.

9. A multijoint manipulator which comprises:
   an upper arm having one end which is pivotally supported at a shoulder joint portion of a main body to be capable of rotation around said shoulder joint portion;
   a lower arm having one end which is pivotablly supported by an elbow joint portion formed at the other end of said upper arm to be capable of rotation around said elbow joint portion;
   a distal device fitted to the distal end of said lower arm;
   a first chain wheel fixedly fitted to said lower arm, having its center coaxial with the center of rotation of said elbow joint portion;
   a second chain wheel rotatably fitted to said shoulder joint portion,
   the center of said second chain wheel being coaxial with the center of revolution of said shoulder joint portion;
   a motor mounted on said upper arm to rotate said lower arm around said elbow joint portion as a center of revolution;
   a sprocket wheel secured to the motor shaft of said motor which is positioned between said first and second chain wheels;
   a transmitting means for linking said sprocket wheel and said first and second chain wheels to rotate said first and second chain wheels at the same angle; and
   a torque producing means which has one end secured to said main body and the other end secured to said second chain wheel to impart the maximum torque when said lower arm is in the horizontal position and to impart the minimum torque when said lower arm is in the vertical position, wherein when said lower arm is in the horizontal position, the other end of said torque producing means is at the periphery portion of said second chain wheel on a linear line perpendicular to a line passing through the center of revolution of said shoulder joint portion and said one end secured to said main body,
   whereby said torque producing means is affected only by the position of said lower arm.

10. A multijoint manipulator according to claim 9 wherein said sprocket wheel is placed in the intermediate of said first and second chain wheels.

* * * * *